No. 837,767. PATENTED DEC. 4, 1906.
W. I. AIMS.
MOISTURE PROOF JOINT.
APPLICATION FILED JUNE 15, 1906.

WITNESSES

INVENTOR
Walton I. Aims
BY Munn & Co
ATTORNEYS

UNITED STATES PATENT OFFICE.

WALTON I. AIMS, OF NEW YORK, N. Y.

MOISTURE-PROOF JOINT.

No. 837,767.

Specification of Letters Patent.

Patented Dec. 4, 1906.

Application filed June 15, 1906. Serial No. 321,855.

*To all whom it may concern:*

Be it known that I, WALTON I. AIMS, a citizen of the United States, and a resident of the city of New York, borough of Manhattan, in the county and State of New York, have invented a new and Improved Moisture-Proof Joint, of which the following is a full, clear, and exact description.

The invention relates to tunnels and like structures requiring moisture-proof joints at the sections; and its object is to provide a new and improved joint arranged to render the abutting flanges of the sections moisture-proof at the bolts connecting the flanges with each other.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1:
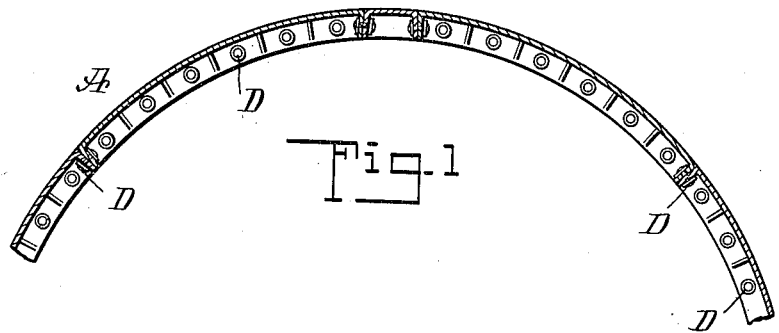
Figure 2:
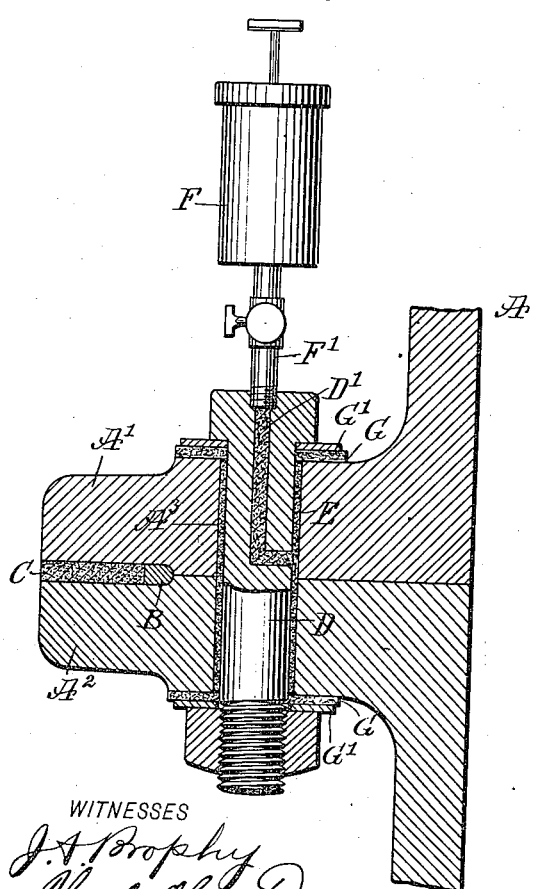
Figure 3:
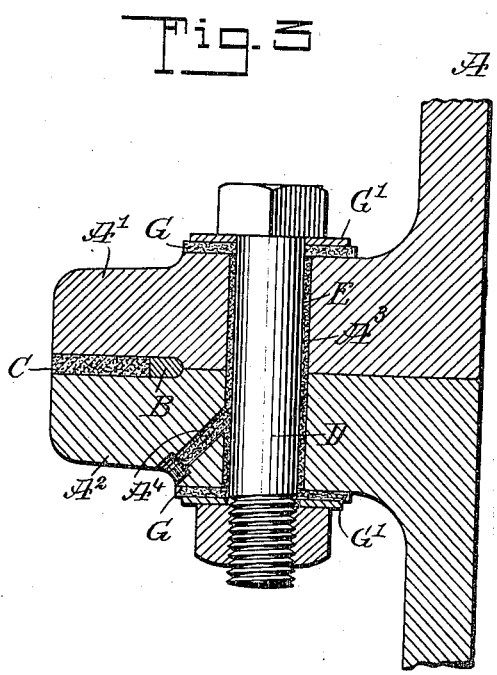

Figure 1 is a cross-section of part of a sectional tunnel-shell provided with the improvement. Fig. 2 is an enlarged sectional elevation of the improvement, and Fig. 3 is a like view of a modified form of the same.

In tunnels, especially such as are constructed through the bed of rivers and other water-ways, it is very essential that the tunnel-wall is rendered completely water and moisture proof. Tunnels such as referred to consist usually of a sectional metallic shell A, such as shown in Fig. 1, and a wall of brick or other material, and it is essential that the sections of the shell are rendered water and moisture proof at all joints, bolt-holes, &c.
The joint between the abutting flanges $A'$ $A^2$ of adjacent shell-sections is rendered water and moisture proof by calking the joint, preferably with lead B and cement C, as plainly indicated in Figs. 2 and 3. The bolt-hole $A^3$, formed in the abutting flanges $A'$ $A^2$, is necessarily somewhat larger than the bolt D engaging the bolt-hole and used for fastening the flanges $A'$ and $A^2$ securely together. Now in order to render the joint water and moisture proof at the bolt-hole $A^3$ is the object of the present invention. For the purpose mentioned the space between the bolt D and the wall of the bolt-hole $A^3$ is filled with waterproof or moisture-proof material E—
such as grout, waterproofing-cement, iron cement, asphalt, coal-tar, and the like. In order to introduce the material E while in a plastic state into the space referred to and after the bolt is in place and the flanges $A'$ $A^2$ fastened together by the bolt, I prefer to form a channel $D'$ in the bolt D, the channel leading from one outer end of the bolt centrally inward, to then pass to the peripheral surface of the bolt—that is, open into the space between the bolt and the wall of the bolt-hole $A^3$. The outer end of this channel $D'$ is engaged by the discharge end $F'$ of a pump F or a like device for forcing the material E through the channel $D'$ into the space between the bolt D and the bolt-hole $A^3$. As shown in Fig. 3, a channel $A^4$ may be formed in one of the flanges $A'$ or $A^2$ and extending from the outside thereof to the bolt-hole, and in this case the discharge end $F'$ of the pump F is connected with the outer end of the channel $A^4$, and then the material is forced by the pump F through the channel $A^4$ into the space between the bolt D and the bolt-hole $A^3$. In either case the material E is forced under pressure into the space between the bolt and the wall of the bolt-hole $A^3$, so that the said space is completely and compactly filled to render the bolt-hole completely water and moisture proof.

It is understood that the plastic material forced around the bolt in the bolt-hole soon sets and hardens, and thereby prevents all leakage of water or moisture that may pass to the bolt-hole by way of the joint between the flanges from the outside of the metallic shell. The usual felt washers G or metallic washers $G'$ are employed on each bolt D at the head and nut thereof, as plainly indicated in Figs. 2 and 3.

By the simple means shown and described the numerous bolt-holes in a tunnel-shell and like structure can be very quickly and economically rendered water and moisture proof.

Having thus described my invention, I claim as new and desire to secure by Letters Patent—

1. A moisture-proof joint, comprising abutting flanges, a bolt for fastening the flanges together, and a waterproof material surrounding the bolt in the bolt-hole of the flanges and throughout the length of the bolt-hole.

2. A moisture-proof joint for flanges bolted together, provided with a waterproof plastic material filling the space between the bolt and the wall of the bolt-hole in the flanges.

3. A moisture-proof joint for flanges bolted together, provided with a waterproof plastic material filling the space between the bolt and the wall of the bolt-hole in the flanges, and means for forcing the material into the said space.

4. A moisture-proof joint for flanges bolted together, provided with a waterproof plastic material filling the space between the bolt and the wall of the bolt-hole in the flanges, and means for forcing the material into the said space by way of a channel in the bolt.

In testimony whereof I have signed my name to this specification in the presence of two subscribing witnesses.

WALTON I. AIMS.

Witnesses:
  THEO. G. HOSTER,
  EVERARD B. MARSHALL.